US007037575B2

(12) United States Patent
Forry et al.

(10) Patent No.: US 7,037,575 B2
(45) **Date of Patent: *May 2, 2006**

(54) PROCESS FOR HIGH FIDELITY PRINTING OF TISSUE SUBSTRATES, AND PRODUCT MADE THEREBY

(75) Inventors: Mark Edwin Forry, Hamilton, OH (US); Prashanth M. Kini, Cincinnati, OH (US); Amanda K. Jones, Cincinnati, OH (US); Nicholas James Nissing, Cincinnati, OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 120 days.

(21) Appl. No.: 09/443,781

(22) Filed: Nov. 19, 1999

(65) Prior Publication Data

US 2002/0146548 A1 Oct. 10, 2002

(51) Int. Cl.
*B32B 29/00* (2006.01)
*B32B 3/00* (2006.01)
*B32B 7/00* (2006.01)

(52) U.S. Cl. ....................... 428/211; 428/131; 428/218; 428/220; 162/112; 162/134; 503/227

(58) Field of Classification Search ................. 162/112, 162/134; 428/195, 211, 220, 131, 218; 503/227
See application file for complete search history.

(56) References Cited

U.S. PATENT DOCUMENTS

| | | | | | |
|---|---|---|---|---|---|
| 4,690,858 | A | * | 9/1987 | Oka et al. | 428/216 |
| 5,123,343 | A | | 6/1992 | Willer | |
| 5,314,861 | A | * | 5/1994 | Morohoshi et al. | 503/227 |
| 5,339,730 | A | | 8/1994 | Ruppel et al. | |
| 5,370,735 | A | | 12/1994 | Beisswanger | |
| 5,490,457 | A | | 2/1996 | Boulanger et al. | |
| 5,520,112 | A | | 5/1996 | Schleinz et al. | |
| 5,612,118 | A | | 3/1997 | Schleinz et al. | |
| 5,612,282 | A | * | 3/1997 | Komamura et al. | 503/227 |
| 5,776,280 | A | * | 7/1998 | Puckett et al. | 156/235 |
| 5,820,730 | A | * | 10/1998 | Phan et al. | 162/112 |
| 5,855,738 | A | | 1/1999 | Weisman et al. | |
| 5,980,691 | A | | 11/1999 | Weisman et al. | |
| 6,096,412 | A | * | 8/2000 | McFarland et al. | 428/211 |
| 6,165,319 | A | * | 12/2000 | Heath et al. | 162/112 |

FOREIGN PATENT DOCUMENTS

| | | |
|---|---|---|
| EP | 0 414 015 A2 | 2/1991 |
| JP | 01-254800 | 10/1989 |
| WO | WO 96/22335 | 7/1996 |
| WO | WO 97/01447 | 1/1997 |
| WO | WO 97/01448 | 1/1997 |
| WO | WO 99/47752 | 9/1999 |

OTHER PUBLICATIONS

Sample napkin with birds.
Sample flowered towel.
Sample bird towel.
R.J.M.Kool: "Entwicklungen im Textildruckbereich" Melliand Textilberichte., vol. 73, No. 12, Dec. 1992, pp. 969–974, XP000339143 Heidelberg DE.

* cited by examiner

*Primary Examiner*—Bruce H. Hess
*Assistant Examiner*—B. Shewareged
(74) *Attorney, Agent, or Firm*—Larry L. Huston; Julia A. Glazer; Stephen T. Murphy

(57) ABSTRACT

Tissue paper having indicia disposed thereon. The tissue paper may be through air dried, or otherwise structured to provide a texture on at least one face. The textured face of the tissue paper has indicia printed thereon. The indicia provides a high fidelity, realistic visual impression of whatever is represented thereby. This realistic impression allows the indicia to be taken from photographic sources, as well as artwork.

16 Claims, 4 Drawing Sheets

(3 of 4 Drawing Sheet(s) Filed in Color)

PROCESS FOR HIGH FIDELITY PRINTING OF TISSUE SUBSTRATES, AND PRODUCT MADE THEREBY

FIELD OF THE INVENTION

The present invention relates to tissue paper having printed indicia thereon.

BACKGROUND OF THE INVENTION

Tissue paper is well known in the art. Tissue paper is used as facial tissue, bath tissue, paper toweling, napkins, place mats, etc. The tissue paper may be provided with indicia for either aesthetic or functional purposes. Indicia may also be applied to paper plates. Typically the indicia are printed.

Consumers react positively to aesthetically pleasing indicia. Printed indicia have evolved from line printing to process printing, evoking positive consumer response. However, current process printing, without more, is not, sufficient to render high fidelity indicia on tissue substrates. High fidelity printing is necessary to reproduce, with fidelity, indicia corresponding to the source of the indicia. In the prior art, the source of the indicia has typically been artwork. Artwork is authored by an artist, may optionally correspond to a theme which is desirable to the consumer, and is commercially available from several vendors.

More recently photographs have been used as the source of the indicia. Photographs may be taken of landscapes, scenery, or even of artwork. Photographic sources of indicia comprising individual elements such as animals, flowers, etc. may be particularly desirable to consumers. Photographs comprise images which are reproduced digitally, including scanning, otherwise electronically, or chemically onto a film. It is not critical how the photograph is reproduced, only that it be reproducible to a tangible medium of expression.

However, high fidelity printing of indicia taken from a photographic source presents special challenges. If several parameters are not properly adjusted, the indicia will not have enough fidelity to appear realistic.

Recently, one vendor of commercial printing equipment executed quality printing on a tissue substrate. However, the substrate was apparently conventionally dried on a press felt. Printing high fidelity indicia on a conventionally dried substrate is a relatively easy task because such a substrate is smooth. But consumers often desire through air dried substrates, which are textured. However, printing high fidelity indicia on a textured substrate is more difficult due to the rugosities and asperities inherent in the substrate.

Successful printing of high fidelity indicia on a textured substrate does not directly translate from experiences printing such indicia on a smooth substrate. Several complications occur. For example, textured through air dried substrates are typically more absorbent. This increased absorbency results in dot gain, causing dots of ink to run together, blurring the image represented by the indicia. The dot gain may be accommodated by decreasing the amount of ink used to print the indicia. However, a uniform downward adjustment of all colors will result in indicia having a muddy appearance or even a faded and washed out appearance, if enough color is removed. Such adjustments can either be done electronically with software or by adding less ink to the printing roll.

Compensating for dot gain on a tissue paper substrate is made particularly difficult by the nonlinear response of the dot gain as a function of the amount of area collectively covered by the dots. Referring to FIG. 1, it is seen that the dot gain increases as less area of the tissue paper is desired to be covered. However, the nonlinear response does not permit easy compensation for the dot gain by decreasing the amount of ink alone.

Another approach to compensating for the increased absorbency of a textured substrate is to try color purification. Color purification results from using fewer primary colors to achieve the desired shade. For example, four color printing may use magenta, yellow, cyan, and black to produce a spectrum of colors. Alternatively, four color printing may utilize brown, green, blue and black, provided red and orange shades are not desired. If one used an evenly reduced mix of the four process colors to achieve the same shades as was produced using more colors, less total ink could be applied to the textured substrate. However, color purification, without more, results in indicia having a faded and washed out appearance.

In yet another approach, one could increase the resolution and decrease the volume of the anilox roll used to print the indicia if flexographic printing is used. However, this approach has been shown to result in less than full coverage of ink occurring where the indicia is desired, and requires higher pigment concentrations in the ink.

It is clear that there is a need in the art for an improved printing process, particularly one which yields high fidelity printed indicia on a textured substrate. There is further a need for such a process which can be used with photographically sourced indicia. Such a process, and the printed tissue paper produced thereby are described and claimed below.

The present invention is also applicable to printing on other textured substrates. For example, textured substrates may be used in packaging to provide surfaces which are easily gripped by the user. Further, the substrate need not be cellulosic, if other material properties are desired.

SUMMARY OF THE INVENTION

The invention comprises a process for printing indicia on a textured substrate. The indicia have high fidelity to the original from which they were taken. The process comprises the steps of providing a textured substrate. The substrate has first and second opposed faces, at least one of which is textured. A, photograph is also provided. The photograph has a first resolution. A printing roll is provided. The printing roll has a second resolution which is less than the first resolution. The printing roll has an image thereon. The image is taken from the photograph. The resolution of the photograph is greater than or equal to the resolution of the printing roll. Ink is applied to the printing roll, and then transferred from the printing roll to the substrate. Indicia representative of the photograph are formed on the substrate and have a specified black level.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
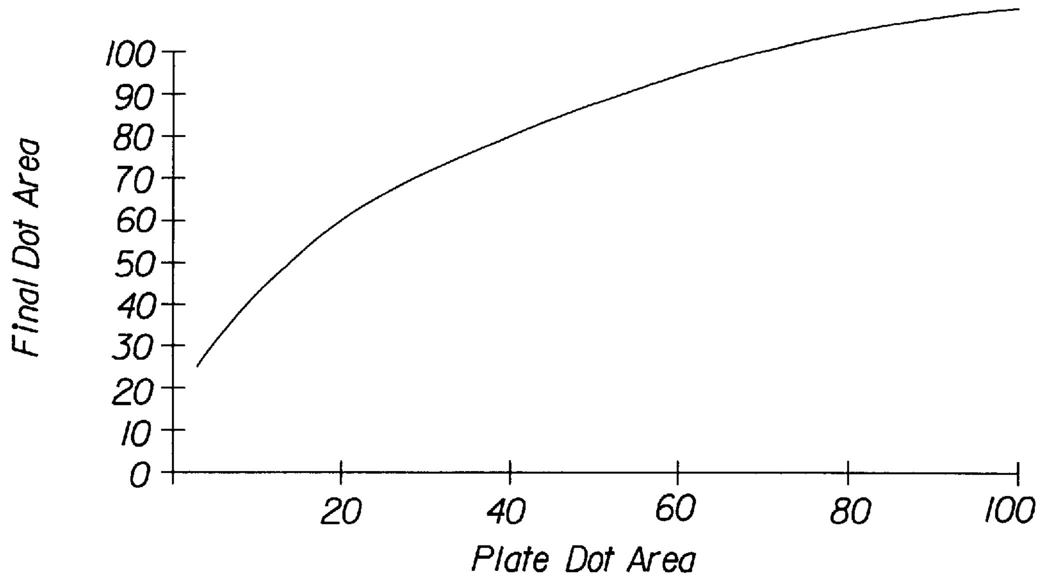
FIG. 1 is a graphical representation of dot gain as a function of the amount of ink covered by the dots.

The present invention comprises tissue paper having high fidelity indicia printed thereon. The tissue paper is textured, and suitable for a variety of household tasks, as noted above. The printed indicia are visible to the consumer and may be provided for aesthetic purposes, whereby the tissue provides a visually pleasing appearance. Alternatively, the indicia may be functional wherein they provide instructions for use of the product, relevant data, etc.

Examining the tissue substrate in more detail, the tissue substrate is textured. By textured, it is meant that the tissue substrate has a physiological surface smoothness greater than 800 microns, preferably greater than 850 microns, more preferably greater than 900 microns, and most preferably greater than 1000 microns.

The tissue paper according to the present invention has first and second opposed surfaces. The tissue paper is considered to meet the limitations set forth above if either the first, the second, or both of the opposed faces meets the aforementioned texture values for physiological surface smoothness and has indicia disposed on at least its face which meets the aforementioned physiological surface smoothness. It is to be recognized that indicia may also be disposed on the opposite face of the tissue paper, without regard to whether or not that face meets the aforementioned physiological surface smoothness limitations.

The tissue according to the present invention preferably has micropeaks, typically occurring in the machine direction as a result of an optional foreshortening operation. Foreshortening may be accomplished by wet microcontraction, rush transfer, or preferably creping. However, it is to be recognized that foreshortening is an optional operation and need not be performed at all.

A plurality of the micropeaks may have a micropeak height of at least 0.3 and preferably at least 0.6 millimeters. Micropeak height is the amplitude of the undulations in the tissue taken normal to the base plane of the tissue. Micropeak height is measured as the distance from the base plane of the tissue to the top of the micropeak of the tissue. The measurements may be made from digitized images as is known in the art and illustrated in commonly assigned U.S. Pat. No. 5,855,738, incorporated herein by reference and issued Jan. 5, 1999 to Weisman et al. Micropeak width is orthogonal to micropeak height and represents the lateral extent of the micropeak. Micropeak width is measured at an elevation coincident one-half of the micropeak height.

The tissue according to the present invention may have a micropeak frequency of about 3 to 10 micropeaks per centimeter. Micropeak frequency is measured from digitized images as set forth above and known in the art. A digitized cross-sectional image of about 40×may be suitably utilized for the aforementioned measurements. Typically the image covers about 2.0 to 2.8 millimeters of tissue.

For the physiological surface smoothness measurement, a sample of the tissue paper is selected which avoids wrinkles, tears, perforations, or gross deviations from macroscopic monoplanarity. The tissue paper, a portion of the sample on or equivalent to that having printed indicia thereon is tested. The tissue paper according to the present invention is considered to be textured if either side of any portion of the tissue paper having printing thereon meets the textured criterion set forth above, or if a like portion of the same sample juxtaposed with near, adjacent, or between printed elements meets the textured limitation set forth above. The sample is conditioned at 22 to 24° C. and 48 to 52% relative humidity for at least two hours prior to testing. The sample is placed on a motorized table and magnetically secured in place. Either face of the sample may be selected for the measurement, provided all traces are taken from the same face.

Physiological surface smoothness is obtained by scanning the tissue paper sample in any direction with a profilometer to obtain the Z-direction displacement as a function of distance. The Z-direction displacement is converted to an amplitude versus frequency spectrum by a Fourier Transform. The spectrum is then adjusted for human tactile response using a series of filters. The peak heights of the filtered amplitude frequency curve are summed from 0 to 10 cycles per millimeter to give the result.

The tissue paper sample is approximately 100 millimeters×100 millimeters in size and mounted on a motorized table. While any suitable table will suffice, a table with surface tester model KES-FB-4NKES-SE, available from Kato Tech Company Limited of Koyota, Japan, or a CP3-22-01 DCI Mini Precision table using a NuStep 2C NuLogic Two Axis Stepper Motor Controller in the closed loop control mode have been found suitable. The table has a constant drive motor which travels at the rate of 1 millimeter per second. The sample is scanned 30 millimeters in the forward direction transversely indexed one millimeter, then reversed. Data are collected from the center 26 millimeters of the scan in both the forward and reverse directions. The first and last 2 millimeters of each scan are ignored and not used in the calculations.

The profilometer has a probe with a tip radius of 2.54 microns and an applied force of 0.20 grams. The gauge range is calibrated for a total Z-direction displacement of 3.5 millimeters. Over the scan distance of the sample, the profilometer senses the Z-direction displacement of the stylus in millimeters. The output voltage from the gauge controller is digitized at a rate of at least 20 points per second. Over the entire 26 millimeter scan range, 512 pairs of time surface height data points are obtained for both the forward and reverse directions of a scan. The profilometer is mounted above the sample table such that the surface topography can be measured. A suitable profilometer is a EMD 4320 WI Vertical Displacement Transducer, having an EPT 010409 stylus tip, and an EAS 2351 Analog Amplifier. This equipment is obtainable from Federal Products of Providence, R.I.

The digitized data pairs are imported into a standard statistical analysis package for further analysis. Suitable software analysis packages included SAS of Cary, N.C., and preferably LabVIEW Instrument Control Software 3.1 available from National Instruments of Austin, Tex. When using the LabVIEW software, raw data pairs linking surface height and time from the individual scans are centered about the mean using the Mean.vi analysis tool in the LabVIEW software. The 512 data points from each of the 16 traces are converted to 16 amplitude spectra using the Amplitude and Phase Spectrum.vi tool. Each spectrum is then smoothed using the method described by the PROC Spectra Method of the SAS software. LabVIEW smoothing filter values of 0.000246, 0.000485, 0.00756, 0.062997, 0.00756, 0.000485, 0.000246 are utilized. The output from this tool is taken as the Amp Spectrum Mag (vrms). The amplitude data are then adjusted for human tactile response using a series of frequency filters designed from Verrillo's data on vibrotactile thresholds as a function of vibration frequency as set forth in the Journal of Acoustical Society of America, in the article entitled "Effect Of Contactor Area On The Vibrotactile Threshold", Vol. 35, 1962 (1963). The aforementioned data are reported in a time domain as cycles per second and converted to the spatial domain in cycles per millimeter. The conversion factor and filter values are found in the procedure set forth in the 1991 International Paper Physics Conference, TAPPI Book 1, more particularly the article entitled "Methods For The Measurement Of The Mechanical Properties Of Tissue Paper" by Ampulski, et al., and found at page 19, utilizing the specific procedure set forth at page 22 entitled "Physiological Surface Smoothness", and incorporated herein by reference. The response from the filters are set at 0 below the minimum threshold and above the maximum response frequencies and varies from 0 to 1 therebetween as described by the aforementioned Ampulski et al. article.

Figure 5:
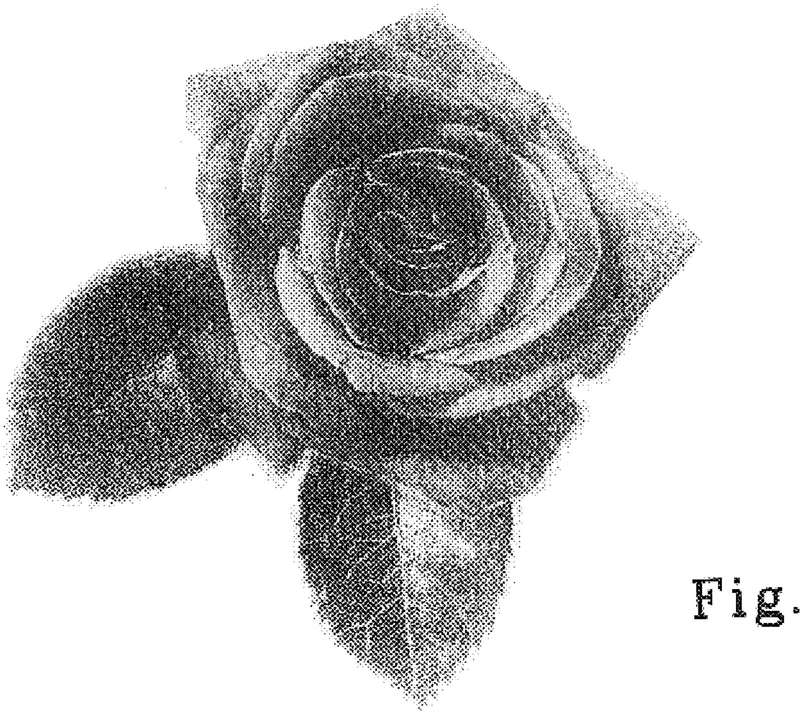

The physiologically adjusted frequency amplitude data are obtained by multiplying the amplitude spectra described above by the appropriate filter value at each frequency. A typical amplitude spectrum and filtered amplitude spectrum are illustrated in FIG. 5 of the aforementioned Ampulski et al. article. The Verrillo-adjusted frequency amplitude curve is summed point by point between 0 and 10 cycles per millimeter. This summation is considered to be the physiological surface smoothness. The eight forward and eight reverse physiological surface smoothness values thus obtained are then averaged and reported in microns.

Physiological surface smoothness measurements using the SAS software is described in commonly assigned U.S. Pat No. 4,959,125, issued Sep. 25, 1990 to Spendel; U.S. Pat. No. 5,059,282, issued Oct. 22, 1991 to Ampulski et al.; U.S. Pat. No. 5,855,738, issued Jan. 5, 1999 to Weisman et al., and U.S. Pat. No. 5,980,691, issued Nov. 9, 1999 to Weisman et al., which patents are incorporated herein by reference.

The textured tissue paper has first and second opposed surfaces as noted above. To obtain the texture on either, or both, of the first and second opposed surfaces, the tissue may be through air dried. Through air dried tissue is disclosed in commonly assigned U.S. Pat. No. 4,529,480, issued Jul. 16, 1985 to Trokhan; U.S. Pat. No. 4,637,859, issued Jan. 20, 1987 to Trokhan; U.S. Pat. No. 5,364,504, issued Nov. 15, 1994 to Smurkoski et al.; U.S. Pat. No. 5,529,664, issued Jun. 25, 1996 to Trokhan et al.; U.S. Pat. No. 5,679,222 issued Oct. 21, 1997 to Rasch et al.; U.S. Pat. No. 5,714,041 issued Feb. 3, 1998 to Ayers et al.; U.S. Pat. No. 5,906,710, issued May 25, 1999 to Trokhan, which patents are incorporated herein by reference. Alternatively, the tissue paper may be through air dried and made as disclosed in U.S. Pat. No. 5,429,686 issued Jul. 4, 1995 to Chiu et al. and U.S. Pat. No. 5,672,248 issued Sep. 30, 1997 to Wendt et al.

Alternatively, the tissue paper may be textured by providing various regions of differing basis weights, so that a multi-basis weight tissue paper and even an apertured tissue paper is presented. Multi-basis weight tissue paper is disclosed in commonly assigned U.S. Pat. No. 5,245,025, issued Sep. 14, 1993 to Trokhan et al.; U.S. Pat. No. 5,527,428 issued Jun. 18, 1996 to Trokhan et al.; U.S. Pat. No. 5,534,326 issued Jul. 9, 1996 to Trokhan et al.; U.S. Pat. No. 5,654,076, issued Aug. 5, 1997 to Trokhan et al.; U.S. Pat. No. 5,820,730, issued Oct. 13, 1998 to Phan et al.; U.S. Pat. No. 5,277,761, issued Jan. 11, 1994 to Phan et al.; U.S. Pat. No. 5,443,691, issued Aug. 22, 1995 to Phan et al.; U.S. Pat. No. 5,804,036 issued Sep. 8, 1998 to Phan et al.; U.S. Pat. No. 5,503,715, issued Apr. 2, 1996 to Trokhan et al.; U.S. Pat. No. 5,614,061, issued Mar. 25, 1997 to Phan et al.; U.S. Pat. No. 5,804,281 issued Sep. 8, 1998 to Phan et al.; and U.S. Pat. No. 5,900,122 issued May 4, 1999 to Huston, which patents are incorporated herein by reference. A nonwoven and apertured material may be utilized for the substrate as illustrated by commonly assigned U.S. Pat. No. 5,895,623 iss. Apr. 20, 1999 to Trokhan et al.

Alternatively, the paper may be conventionally dried with a texture according to commonly assigned U.S. Pat. No. 5,549,790, issued Aug. 27, 1996 to Phan; U.S. Pat. No. 5,556,509, issued Sep. 17, 1996 to Trokhan et al.; U.S. Pat. No. 5,580,423, issued Dec. 3, 1996 to Ampulski et al.; U.S. Pat. No. 5,609,725, issued Mar. 11, 1997 to Phan; U.S. Pat. No. 5,629,052 issued May 13, 1997 to Trokhan et al.; U.S. Pat. No. 5,637,194, issued Jun. 10, 1997 to Ampulski et al.; U.S. Pat. No. 5,674,663, issued Oct. 7, 1997 to McFarland et al.; U.S. Pat. No. 5,693,187 issued Dec. 2, 1997 to Ampulski et al.; U.S. Pat. No. 5,709,775 issued Jan. 20, 1998 to Trokhan et al.; U.S. Pat. No. 5,776,307 issued Jul. 7, 1998 to Ampulski et al.; U.S. Pat. No. 5,795,440 issued Aug. 18, 1998 to Ampulski et al.; U.S. Pat. No. 5,814,190 issued Sep. 29, 1998 to Phan; U.S. Pat. No. 5,817,377 issued Oct. 6, 1998 to Trokhan et al.; U.S. Pat. No. 5,846,379 issued Dec. 8, 1998 to Ampulski et al.; U.S. Pat. No. 5,855,739 issued Jan. 5, 1999 to Ampulski et al.; U.S. Pat. No. 5,861,082 issued Jan. 19, 1999 to Ampulski et al., U.S. Pat. No. 5,871,887 issued Feb. 16, 1999 to Trokhan et al.; U.S. Pat. No. 5,897,745 issued Apr. 27, 1999 to Ampulski, et al.; and U.S. Pat. No. 5,904,811 issued May 18, 1999 to Ampulski et al., incorporated herein by reference.

Alternatively, after the indicia are applied to the tissue paper, the texture may be imparted to the tissue paper by embossing. Knob to knob embossing is well known in the art as illustrated by commonly assigned U.S. Pat. No. 3,414,459, issued Dec. 3, 1968 to Wells and incorporated herein by reference. The texture may also be imparted to the tissue paper by nested embossing as illustrated by U.S. Pat. No. 4,320,162, issued Mar. 16, 1982 to Schulz et al. and incorporated herein by reference. Alternatively, the texture may be imparted to the tissue paper by dual ply lamination embossing as illustrated by commonly assigned U.S. Pat. No. 5,468,323, issued Nov. 21, 1995 to McNeil and incorporated herein by reference. It is to be recognized that the process of printing tissue paper which is smooth, rather than textured as defined herein, and embossing such tissue paper after printing, and the tissue paper made thereby, is outside the scope of the present invention. The process according to the present invention of printing the tissue paper after embossing provides the benefit that the print more closely follows the embossment pattern. If the tissue paper is embossed after printing, the indicia are distorted by the embossing process resulting in more of the unprinted substrate showing through as the tissue paper is stretched upon embossment. One of ordinary skill will recognize that the amount of distortion, and hence the amount of substrate not having indicia and visible to the user is dependent upon the emboss design and emboss depth. Textured paper may be embossed after printing, as is known in the art. Any suitable process for applying the ink to the roll, and even for applying the ink directly to the substrate, may be utilized. Suitable processes for applying the ink to a roll and then from the roll to the tissue paper by printing include, but are not limited to lithography, letter press, gravure, screen printing, intaglio, and preferably flexography. Flexographic printing is preferred because a removable covering is provided for the roll. Coverings include both plates and sleeves as are known in the art. Alternatively, the ink may be sprayed onto or otherwise applied directly to the substrate by ink jet printing as is known in the art.

The raw ink composition of the present invention may have a Shell Cup viscosity at a temperature of 20° C. of preferably about 200 centipoises or less, more preferably about 70 centipoises or less, and most preferably about 25 centipoises or less, although viscosities ranging from 5 centipoise to a pasty consistency can be utilized. As used herein, "raw ink" refers to the ink composition prior to the application process in which it is applied to the substrate. As is well known in the art, a #1 Shell Cup is used to measure viscosities which range from about 1 centipoise to 10 centipoise. A #2 Shell Cup is used to measure viscosities which range from about 7.5 centipoise to 30 centipoise. A #3 Shell Cup is used to measure viscosities which range from about 25 centipoise to 80 centipoise and a #4 Shell Cup is used to measure viscosities which range from about 60 centipoise to 200 centipoise.

The ink compositions of the present invention have a pH in the range of about 2–11 and preferably about 7–10. A surfactant(s) or dispersant(s) may be added to the ink composition to disperse the binder and pigment.

To improve ink rub-off resistance, the ink composition of this invention may contain a wax. A wax suitable for this invention includes but is not limited to a polyethylene wax emulsion. Addition of a wax to the ink composition of the present invention enhances rub resistance by setting up a barrier which inhibits the physical disruption of the ink film after application of the ink to the fibrous sheet. Based on weight percent solids of the total ink composition, suitable addition ranges for the wax are from about 0.5% solids to 10% solids. An example of a suitable polyethylene wax emulsion is JONWAX 26 supplied by S.C. Johnson & Sons, Inc. of Racine, Wis.

Glycerin may also be added to the ink composition of the present invention in order to improve rub-off resistance. Based upon weight percent of the total ink composition, suitable addition ranges for the glycerin range from about 0.5% to 20%, preferably from about 3% to 15%, and more preferably from about 8% to 13%.

Methods of curing the inks of the present invention include but are not limited to thermally curing, electron beam curing, photon curing (for example ultraviolet light, x-ray, and gamma ray), and combinations thereof.

Crosslinking agents are generally added to the finished ink composition or to a pigment dispersion. As used herein, "finished ink composition" refers to an ink composition that contains the key components such as a vehicle, pigment, and binder so as to render the ink composition ready to use. As used herein, "pigment dispersion" refers to a composition comprised of pigment solids, surfactant, and a vehicle such as water or oil to which a binder is added.

Crosslinking agents are believed to enhance the rub-off resistance of the ink by crosslinking with the ink. A non-limiting example of a suitable crosslinking agent, is a solution polymer of a cationic polyamine-epichlorohydrin polymer. Based upon weight percent of the total ink composition, suitable addition ranges for the crosslinking agent are from about 3% to 15%, and preferably from about 4% to 8% (based on the solids content of the crosslinking agent). A preferred crosslinking agent is KYMENE PLUS available from Hercules Inc. of Wilmington, Del.

It is well known in the art that the final ink density is a function of several Variables, such as substrate texture, dot area, anilox cell volume, anilox geometry, pigment concentration, and pigment efficiency. Numerous methods can be used to deliver a given density by changing the relationships between the aforementioned variables. Most important, however, is the mass of pigment deposited on the sheet as the density is proportional to the mass of pigment. While not wishing to be bound by theory, the mass of pigment on the sheet can be roughly estimated by the following equation:

transfer efficiency*pigment concentration*anilox cell volume*print area=mass of pigment on sheet Therefore, if one wishes to achieve a higher ink density, one may increase the pigment concentration, or increase the anilox cell volume. In one preferred execution, an anilox roll with a 4 billion cubic micron cell volume per 6.45 square centimeters (per square inch), 157 lines per centimeter (400 lines per inch), and a 60 degree cell angle is used to deliver an ink density of 0.65. Suitable inks are commonly available from Sun Chemical Corp. of Northlake, Ill. as 16966651 or WKIFW2618324 for yellow, 16966652 or WKIFW4618325 for magenta, 16966653 or WKIFW5618326 for cyan, and 16966654 or WKIFW9618327 for black.

The color density of the indicia may be measured with a densitometer. Color density, a dimensionless measurement, refers to the density of the color produced by the ink or dye. The higher the color density, the greater the intensity or strength of the color. As color density increases, the densitometer measurements also increase. The densitometer measures the color density of the dominant primary color present in the image. The densitometer then displays the color density of the dominant primary color. As used herein, "process color" refers to one of the four colors of yellow, magenta, cyan, and black, which colors are typically disposed on the tissue paper in that order.

A non-limiting list of optional additives which may be added to the finished ink compositions of the present invention include crosslinking agents, printing press hygiene control agents, humectants, corrosion control agents, pH control agents, viscosity modifiers, preservatives, and defoamers.

The printed image produced on the paper can be line work, halftoning, preferably a process print, or a combination of these. As used herein, "line work" refers to a printed image composed of solids and lines. As used herein, "process print" refers to a halftone color print created by the color separation process whereby an image composed of two or more transparent inks is broken down into halftone dots which can be recombined to produce the complete range of colors of the original image.

The advantage of a process printed image over a line work printed image is that the process printed image enables many colors and shades of those colors to be produced with a few inks. For example, a human image may be comprised of ten or more colors. This image can be reproduced by process printing utilizing as few as three colors. The same image reproduced by line work would typically require ten or more inks each with a corresponding printing station on the printing press. Though the preferred ink compositions of the present invention are pigment-based process inks, dyes, and other types of pigment-based inks are within the scope of this invention.

Coloration in a process print image is produced by varying the area of ink deposition in a given image area, frequency of ink deposition, and the number of inks in the image area. Ink deposition area may be varied by adjusting the frequency, size, or combination thereof of halftone dots. Suitable inks are described in commonly assigned application Ser. No. 09/130,615, filed Aug. 7, 1998, in the names of McFarland et al. and incorporated herein by reference.

Preferably, the ink according to the present invention has a color density of at least about 0.50, more preferably at least about 0.55 and is suitable for color densities ranging as high as 1.0 or greater. More particularly, the ink according to the present invention has a color density of at least about 0.55 and preferably 0.70 for yellow and black, and a color density of at least about 0.65 and preferably at least about 0.80 for cyan and magenta. The color density may be measured on any individual color, or upon any element comprising two or more colors.

The color density of indicia applied to tissue paper may be measured using a reflectance densitometer. The densitometer setting is adjusted to read the dominant primary color present in the image. The sample to be measured is placed on top of four unprinted sheets of the tissue paper. The four unprinted sheets are used in order to eliminate any influence of background from a colored surface. Four sheets of a white substrate having a L*a*b* values of about 91.17, 0.64, and 4.29, respectively, wherein the L*a*b* values are measured by a spectrocolorimeter set to A10° observer angle with an A2 illuminant in the CIELAB L*a*b* mode.

Three color density measurements are made within a given color, or within a given color of a particular element, of an indicium using the reflectance densitometer. The average of the three measurements is recorded.

Color density measurements may be measured on any ink or dye applied to any substrate. Preferably color density is measured with a white background, although the color density is measured on a substrate beginning with the white background having the aforementioned L*a*b* values.

One suitable white background is found in Bounty® paper towels marketed by the instant assignee. A suitable densitometer for measuring color density is the X-RITE® 418 Reflectance Densitometer and a suitable calorimeter is the X-Rite 928 Spectrocolorimeter, both commercially available from X-Rite Inc. of Grandville, Mich. From the L*a*b* values, a dimensionless difference is obtained by subtracting the L*a*b* values of the unprinted background from the average L*a*b* measurement found in the indicia. The greater this difference, the greater the color density provided by the ink.

High fidelity printing requires a relatively high degree of color purification. However, a uniform color purification will not suffice. The color purification herein requires a threshold level of the black color in order to reproduce indicia with the requisite fidelity. The requisite fidelity is deemed to be achieved when the indicia subjectively resemble photographs—given the limitations of printing on a textured and/or tissue paper substrate.

For the embodiments described and claimed herein, the indicia have a mean black level of less than or equal to 245, preferably less than or equal to 235, more preferably less than or equal to 225, and most preferably less than or equal to 215. Further, the indicia may have a median black level of less than or equal to 235, and more preferably less than or equal to 225. Black level is measured according to the following procedure.

The black level measurement is an image analysis method useful for quantifying the amount of shadow present, and the average brightness of, the indicia.

A scanner is also provided. The scanner should have a resolution of approximately 59 dots per centimeter (150 dots per inch) and be usable with the image editing and manipulation software.

An AGFA Arcus 11 scanner and corresponding AGFA Fotolook 32 v3.00.00 software (® of Agfa-Gevaert AG) are suitable. Additionally, a visually distinctive 12 Step Opaque Gray Scale is provided. Image editing and manipulation software, such as Adobe® Photoshop® 4.0 software, and a calibrated, X-Rite® 418 Densitometer from the X-Rite Corporation are used. The image editing and manipulation software should provide an RGB to CMYK conversion formula equivalent to the default method of Adobe® Photoshop® 4.0. The Arcus II scanner should be a choice for twain in the Photoshop® software.

The following list is an appropriate output of Densitometer Readings from the grayscale standard:

| | | |
|---|---|---|
| 1 | 0.05 | white |
| 2 | 0.19 | measured luminosity: 215–220 |
| 3 | 0.36 | |
| 4 | 0.51 | |
| 5 | 0.70 | |
| 8 | 0.88 | |
| 9 | 1.37 | |
| 10 | 1.54 | |
| 11 | 1.74 | measured luminosity: 27–32 |
| 12 | 1.92 | black |

If the variation in densitometer readings is greater than +/−0.02, the densitometer should be recalibrated.

The grayscale set forth above is scanned and the optical densities at 0.19 and 1.74 are verified to have the luminosities set forth above as measured in the Photoshop® software using the Histogram tool.

The scanner and software are set as follows:

| | |
|---|---|
| original: | reflective |
| mode: | color RGB |
| Bits per color: | 8 bits |
| input: | 150 ppi |
| scale to: | 100% |
| Range: | Histogram |
| Tone curve: | None |
| Sharpness: | None |
| Descreen: | None |
| Flavor: | None |

The histogram boundaries are set as follows:

| | |
|---|---|
| D Max: | 2.000 D |
| D Min: | 0.050 D |
| R | 100% |
| G | 100% |
| B | 100% |

A sample of the tissue paper or other substrate is provided. The sample should be at least 12.7×12.7 centimeters (5"×5") in size. The histogram boundaries and setup of the Fotolook software are confirmed. The grayscale and sample are placed on the scanner. The grayscale should not cover any indicia, and preferably the sample overlays the grayscale.

The sample and grayscale are scanned into Photoshop® in 24 bit RGB format. Using the marquee tool an area of the sample not having indicia is selected. Preferably the area is as large as possible. If the entire sample has indicia this step maybe omitted.

The histogram is viewed, selecting the luminosity channel. This allows one to see information for the unprinted regions of the sample.

If the histogram shows any pixels at 255 the software scanner settings are confirmed to be as set forth above and the sample is rescanned. If a non-zero pixel count at 255 occurs, the scanner is unsuitable and a new scanner should be selected.

Using the crop tool, the sample is selected to exclude any non-sample area of the background. The selected image is converted into the CMYK mode. A noise-median filter, radius of 5, is selected. The grayscale strip is selected with the marquee tool and inverted with the inverse function. A tolerance of 35 with the anti-aliased selection is set using the magic wand tool. This step is repeated until only the indicia are selected. If some elements of the indicia contain white areas these are included in the selection process.

The black (K) channel is selected from the pallet menu. The mean and median values are then recorded from the Histogram function.

For the embodiments described herein, a three to ten-color printing process is envisioned, with a preferred process having from four to six colors. Assuming a preferred four-color printing process is selected, the principal color may comprise 29 to 46% of the shade making of a particular element of the indicium. The secondary color may be applied at a level of 14 to 29%, the tertiary color—11 to 14%, and the fourth color—0–11%. The above percent figures represent the amount of ink coverage on the printed area of the tissue paper. Black is often the third most dominant color in the printing process according to the present invention and may be used to outline, by shading, a particular element of the indicia. Black was to be used to increase shading, contrast and depth in the indicia.

The indicia, as seen upon the substrate, preferably has an overall color curve with an output value of 3 to 75%. For CMYK indicia, the color curve represents the percentage of color within the total range available to reproduce the indicia. Color curve may be determined multiple ways. One suitable way is to use the PhotoShop 4.0 software distributed by the Adobe Systems Inc. of San Jose, Calif. Preferably the color curve does not exceed 75%, otherwise the indicia may look muddy, rather than sharp.

Preferably, the high fidelity printed indicia according to the present invention displays color gradations, i.e., the blending of one color into an adjacent color, so that a wide range of colors are printed within the indicia. The high fidelity printed indicia according to the present invention has subtle variations in tone as the shades smoothly blend from one shade to the next. Shading is related to color gradations and is accomplished by having gradual transitions from the main part of an element of the indicia into the peripheral regions. Shading provides a shadow or highlight to give the element a more realistic appearance. The high fidelity prints according to the present invention typically utilize a high proportion of dark colors, including black, to create shadows and contrast. In contrast, typical artwork prints use black or dark colors as an abrupt border for the elements of the indicia.

One convenient way to adjust contrast is to utilize the Contrast tool in the aforementioned Photoshop® software. The printed indicia according to the present invention have a contrast of 50 to 70%.

The intensity within a given element of the indicia is adjusted to increase the apparent depth of that element. The range of intensity is adjusted by increasing the contrast of that shade within the element. For example, the lightest color of the element may remain unprinted, i.e. generally white in order to enhance the realistic appearance by providing the perception of roundness, highlights, and glare. Preferably, the photographic source is provided with a color density of less than about 0.05.

The high fidelity print is preferably taken from a photograph, as noted above. The photograph should have a minimum resolution of at least 39 dots per centimeter (100 dots per inch) and more preferably at least 240 dots per centimeter (600 dots per inch). Preferably, the photograph does not have a solid background, such as a sky or thick forest. If the photograph contains too much background imagery, the amount of ink necessary to reproduce the background will overwhelm one's ability to adjust the other colors making up the elements of primary interest.

The indicia may be printed using a flexographic printing process, although prophetically gravure, ink jet, or lithographic printing may be utilized. If a flexographic printing process is utilized according to the present invention, preferably the process utilizes a printing roll having a line screen resolution between 24 to 41 (60 to 105), preferably a resolution of 26 to 39 (65 to 100), and more preferably 26 to 33 lines per centimeter (65 to 85 lines per inch).

Ink may be supplied to the flexographic printing roll by an anilox roll as is known in the art. To assure proper resolution of the ink applied to the printing roll, the anilox roll may have from 78.7 to 394 lines per centimeter (200 to 1000 lines per inch) and a volume of 1 to 10 billion cubic microns per 6.45 square centimeters (per square inch). One suitable anilox roll has been found to have 157 lines per centimeter (400 lines per inch) and a volume of 4 billion cubic microns per 6.45 square centimeters (per square inch). The cells have a cell depth to cell opening ratio of 0.28±5% using a 65 line screen anilox roll. Ink is applied by the print roll to the tissue paper, or other substrate using the print roll. Preferably the print roll has a line screen to anilox cell resolution of not less than 5:1 and preferably not less than 6:1.

In addition to meeting the minimum resolution requirements, the registration of the print must be controlled as well. Preferably the registration is held to a tolerance of 1.6 millimeters (0.063 inches) in each of two perpendicular directions. More preferably, registration is held to at least 0.8 millimeters (0.032 inches). Registration is defined as the offset between the desired and actual placement of the dots. It is preferred to use a printing process having a central impression cylinder and multiple printing stations engaging the central impression cylinder. Utilizing a central impression cylinder reduces occurrences of misregistration of the various colors of the indicia on the substrate. Such misregistration occurs more commonly with the low basis weight, high extensibility substrates common to tissue papers, nonwoven materials, and the like, usable for but not required by the present invention.

It is desirable that each element of the high fidelity indicia have a threshold dimension of at least about 1 centimeter, more preferably 2.5 centimeters, and most preferably 5.0 centimeters, depending upon the level of detail in the elements. The threshold dimension is the largest linear dimension measured in any single direction. Larger elements tend to have a more lifelike and realistic appearance when printed as described herein. Printing resolution and the texture of the tissue paper limit the visual acuity when one views smaller sized elements in the indicia.

Utilizing textured substrates according to the present invention, it is particularly critical, and difficult, to obtain the desired registration. The registration is maintained in the printing process as described below.

EXAMPLE #1

Christmas Wreath

Figure 4:
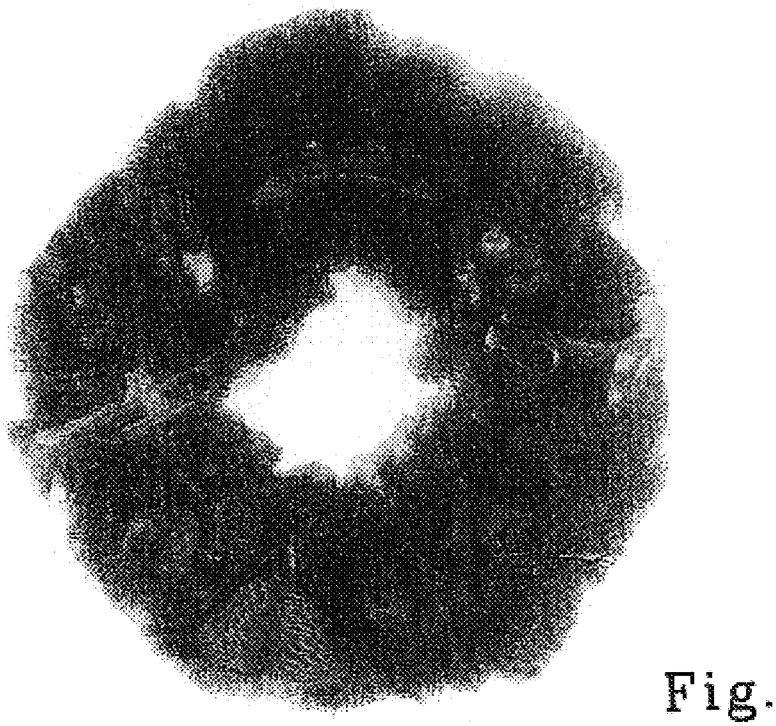
FIGS. 4–5 are flexographically printed indicia according to the present invention as represented in Examples 1 and 2, respectively.

Image Selection: Referring to FIG. 4, for this image, a clip-art electronic file of a high resolution photograph was selected of a Christmas wreath hanging on a door. This image was opened in Adobe® Photoshop® for manipulation.

Background Removal: All of the background elements were selected and removed from the image, leaving only the wreath itself.

Purification: In order to maintain a high fidelity to the original, the majority of the Magenta was removed to maintain an Evergreen color. The primary colors left in the wreath were Yellow and cyan. Black was left in to create the appearance of depth and realism.

Color curve alteration: The color curve output value was reduced to 70% by dragging the output point down the right axis of the color curve until the output level read 70%.

Contrast: The contrast was adjusted to 55%. The brightness was left at zero.

Printing: This sample was printed using the following inks: 16966651, 16966652, 16966653,16966654, commonly available from Sun Chemical Corp. of Northlake, Ill. Target intensities were Y/K=0.55 and M/C=0.65. The press consisted of four stations with the inks in the YMCK order. Anilox roll specifications were 4.0 BCM at 157 lines per centimeter (400 lines per inch).

EXAMPLE #2

Pink Rose

Image Selection: Referring to FIG. 5 for this image, a clip-art electronic file of a high resolution photograph was selected of several roses in a garden. This image was opened in Adobe® Photoshop® for manipulation.

Background Removal: All of the background elements including two of the original roses were selected and removed from the image, leaving only one pink rose.

Purification: In order to maintain a high fidelity to the original, the majority of the Cyan and some of the Yellow was removed to maintain a pink color. Black was left in to create the appearance of depth and realism.

Color curve alteration: The color curve output value was reduced to 70% by dragging the output point down the right axis of the color curve until the output level read 70.

Contrast: The contrast was adjusted to 55%. The brightness was left at zero. In order to create the appearance of realism, the existing veins in one of the leaves was further manipulated with a sponge tool set to "desaturate" at a 50% pressure. Additionally, Magenta was removed from the lightest parts of the image (e.g., the tips of the petals) to create a greater appearance of depth and glare. This manipulation was accomplished using the erasure tool.

Printing: This sample was printed using the following inks: WKIFW2618324, WKIFW4618325, WKIFW5618326, WKIFW9618327, commonly available from Sun Chemical Corp. of Northlake, Ill. Target intensities were YMCK=0.8. The press consisted of four stations with the inks in the YMCK order. Anilox roll specifications were 4.0 BCM at 400 lines per inch.

While the intensities listed in the examples above are the targets, it should be understood that minor adjustments may need to be made to the inks to achieve the appropriate intensity levels due to substrate variations, equipment variations, anilox plugging, nip settings, etc. If the ink intensity is substantially different than the targets, it is recommended that water or toner additions be made according to recommendations of the ink supplier.

Figure 2:
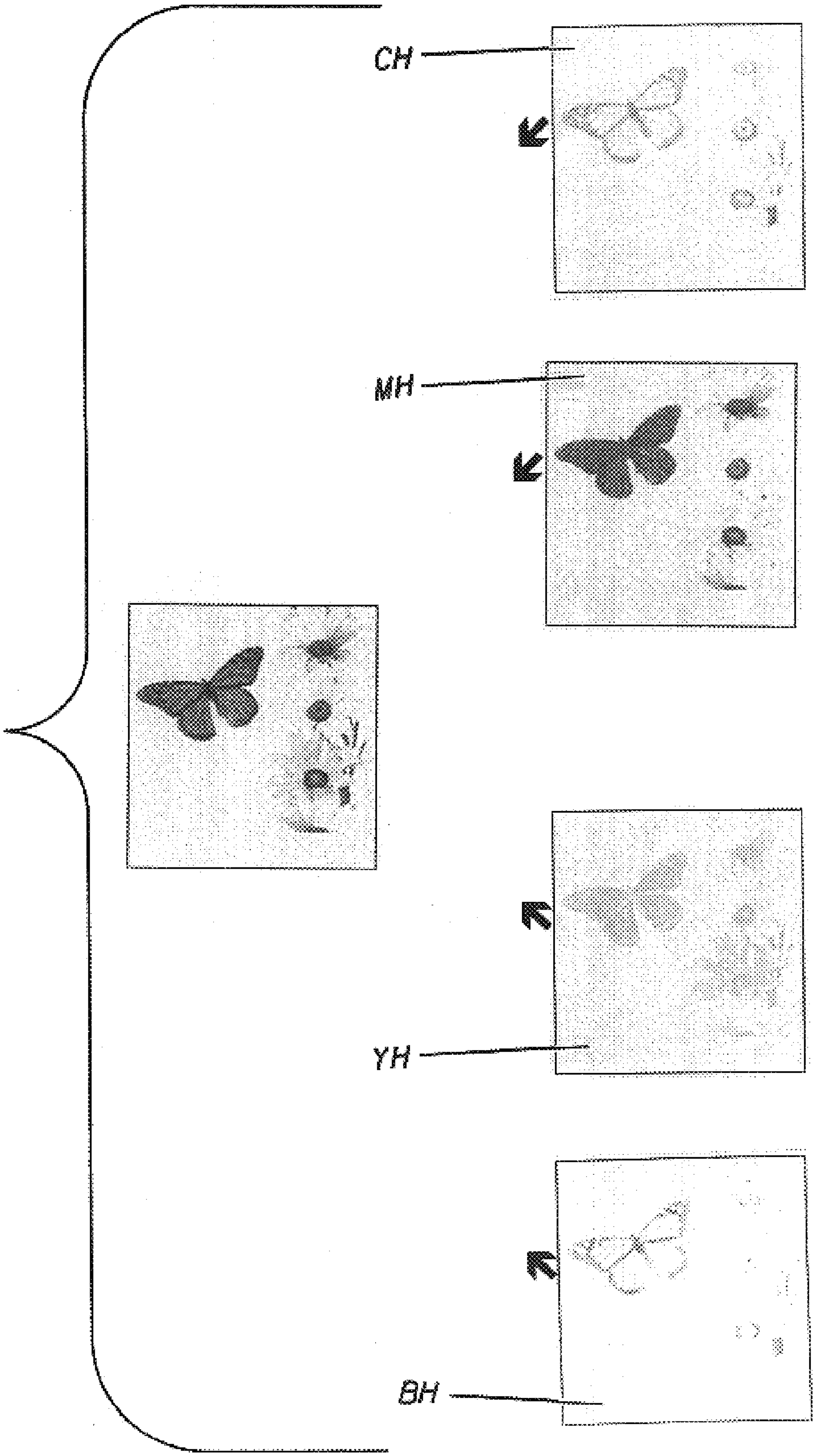
FIG. 2 is a print of a butterfly and flowers according to the present invention, the print being decomposed into the four colors used for the flexographic printing process used to make the print.
Figure 3:
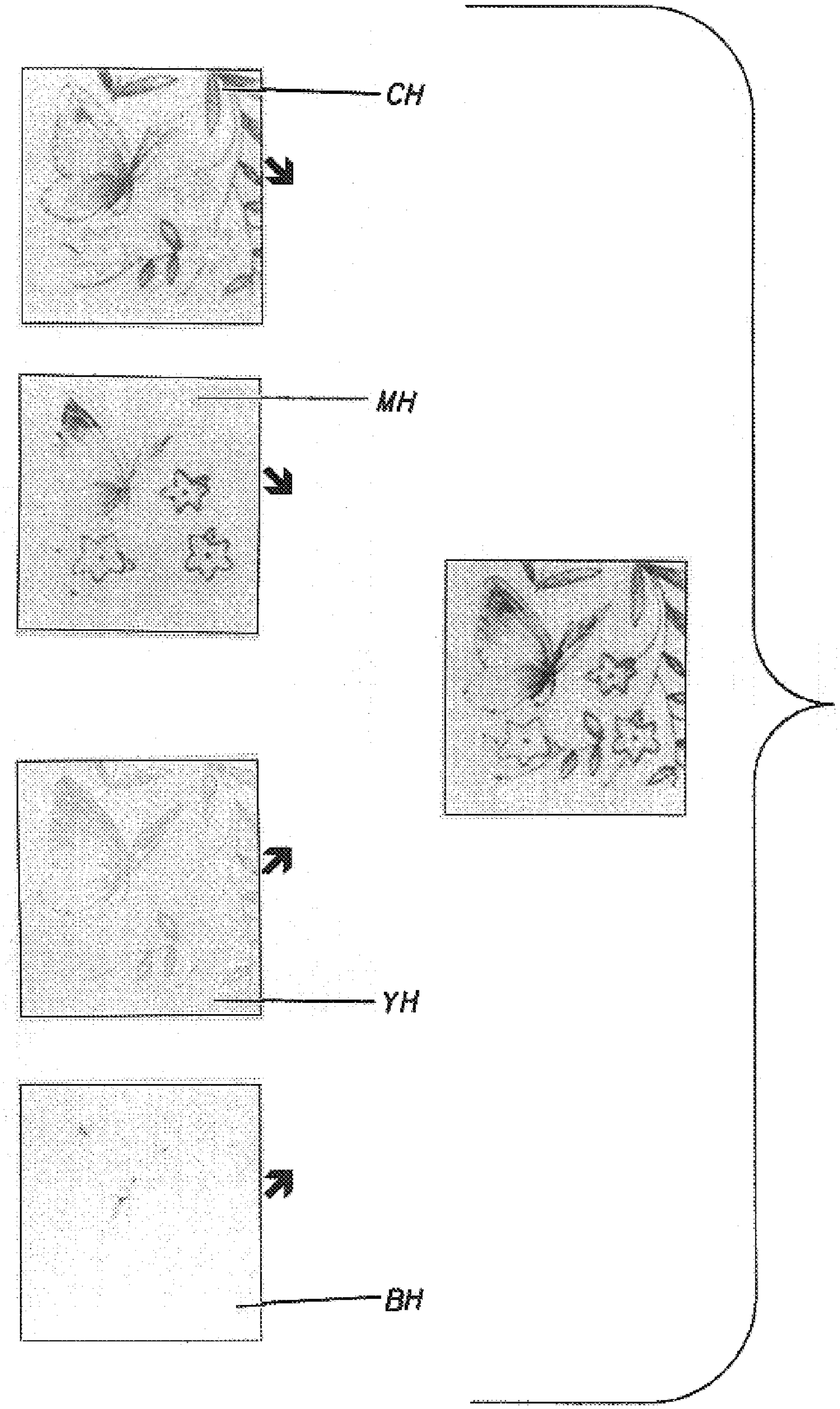
FIG. 3 is a print of a butterfly and flowers according to the prior art, the print being decomposed into the four colors used for the flexographic printing process used to make the print.

Referring to FIGS. 2–3, two prints are shown. Each of these figures has been decomposed into a cyan halftone (CH), a magenta halftone (MH), a yellow halftone (YH), and a black halftone (BH). The print of FIG. 2 is in accordance with the present invention and, taken from a photographic source, and is subjectively realistic. The print according to FIG. 2 has a mean black level of 206 and a median black level of 221. The print of FIG. 3 is taken from hand drawn artwork, and is not subjectively realistic. The print according to FIG. 3 has a mean black level of 244 and a median black level of 255.

What is claimed is:

1. A tissue paper comprising a substrate having first and second opposed faces, at least one of said first and second opposed faces being textured, said textured face having a process printed image disposed thereon, said process printed image representing a photographic source of design elements, said process printed image having a mean black level of less than 245.

2. The tissue paper of claim 1 wherein said textured face has a physiological surface smoothness of greater than 800 microns.

3. The tissue paper of claim 2 wherein said textured face has a physiological surface smoothness of greater than 900 microns.

4. The tissue paper of claim 3 wherein said textured face has a physiological surface smoothness of greater than 1000 microns.

5. The tissue paper of claim 1 wherein said tissue has micropeaks.

6. The tissue paper of claim 5 wherein a plurality of said micropeaks have a micropeak height of at least 0.3 millimeters.

7. The tissue paper of claim 6 wherein said micropeak height of said micropeaks is at least 0.6 millimeters.

8. The tissue paper of claim 5 wherein said micropeak frequency is from about 3 to 10 micropeaks per centimeter.

9. The tissue paper of claim 1 wherein said substrate is through air dried.

10. The tissue paper of claim 1 wherein said substrate includes various regions of differing basis weights.

11. The tissue paper of claim 1 wherein said substrate is apertured.

12. The tissue paper of claim 1 wherein said substrate is conventionally dried.

13. The tissue paper of claim 1 wherein said substrate is embossed.

14. The tissue paper of claim 1 wherein said indicia have a mean black level of less than or equal to 235.

15. The tissue paper of claim 14 wherein said indicia have a mean black level of less than or equal to 225.

16. The tissue paper of claim 15 wherein said indicia have a mean black level of less than or equal to 215.

* * * * *